United States Patent [19]

Kobylarz

[11] Patent Number: 4,821,593

[45] Date of Patent: Apr. 18, 1989

[54] GEAR SELECTOR INDICATOR ADJUSTMENT MECHANISM

[75] Inventor: Lawrence P. Kobylarz, Howell, Mich.

[73] Assignee: May & Scofield, Inc., Howell, Mich.

[21] Appl. No.: 193,035

[22] Filed: May 12, 1988

[51] Int. Cl.⁴ .............................................. B60K 20/00
[52] U.S. Cl. ..................................... 74/475; 116/28.1
[58] Field of Search ............ 116/28.1, 28 R, DIG. 20, 116/31, 35 R, 200, 201, 230, 233, 306, 333; 73/498, 493, 513; 74/840, 841, 842, DIG. 2, 612, 617, 568 R, 606 R, 502.2, 473 R, 471, 475; 188/79.55, 196 BA; 254/1, 426, 264, 127, 129, 387, 391

[56] References Cited

U.S. PATENT DOCUMENTS

| | | | |
|---|---|---|---|
| 3,045,504 | 7/1962 | Emery | 116/230 |
| 3,269,353 | 8/1966 | Koppelmann | 116/230 |
| 3,695,215 | 10/1972 | Lambiris | 116/28.1 |
| 3,739,741 | 6/1973 | Freyermuth | 116/28.1 |
| 3,741,148 | 6/1973 | Hauser | 116/28.1 |
| 3,830,192 | 8/1974 | Ronewicz et al. | 116/28.1 |
| 4,005,614 | 2/1977 | Moore et al. | 74/502.2 |
| 4,412,828 | 11/1983 | Darby | 74/473 R |

*Primary Examiner*—Allan N. Shoap
*Assistant Examiner*—Petar Arsenovic
*Attorney, Agent, or Firm*—Harness, Dickey & Pierce

[57] ABSTRACT

A shift selection indicator assembly for motor vehicles which includes a cable sheath with a cable core passing therethrough having one end coupled to a transmission shifter and another end coupled to a display mechanism. An adjustment assembly is positioned at one end or in-line of the cable sheath and includes a threaded shaft and an adjustment thumbwheel for changing the effective length of the cable sheath and therefore changing the indicated shift position. A detent is provided for maintaining a set adjusted position.

7 Claims, 3 Drawing Sheets

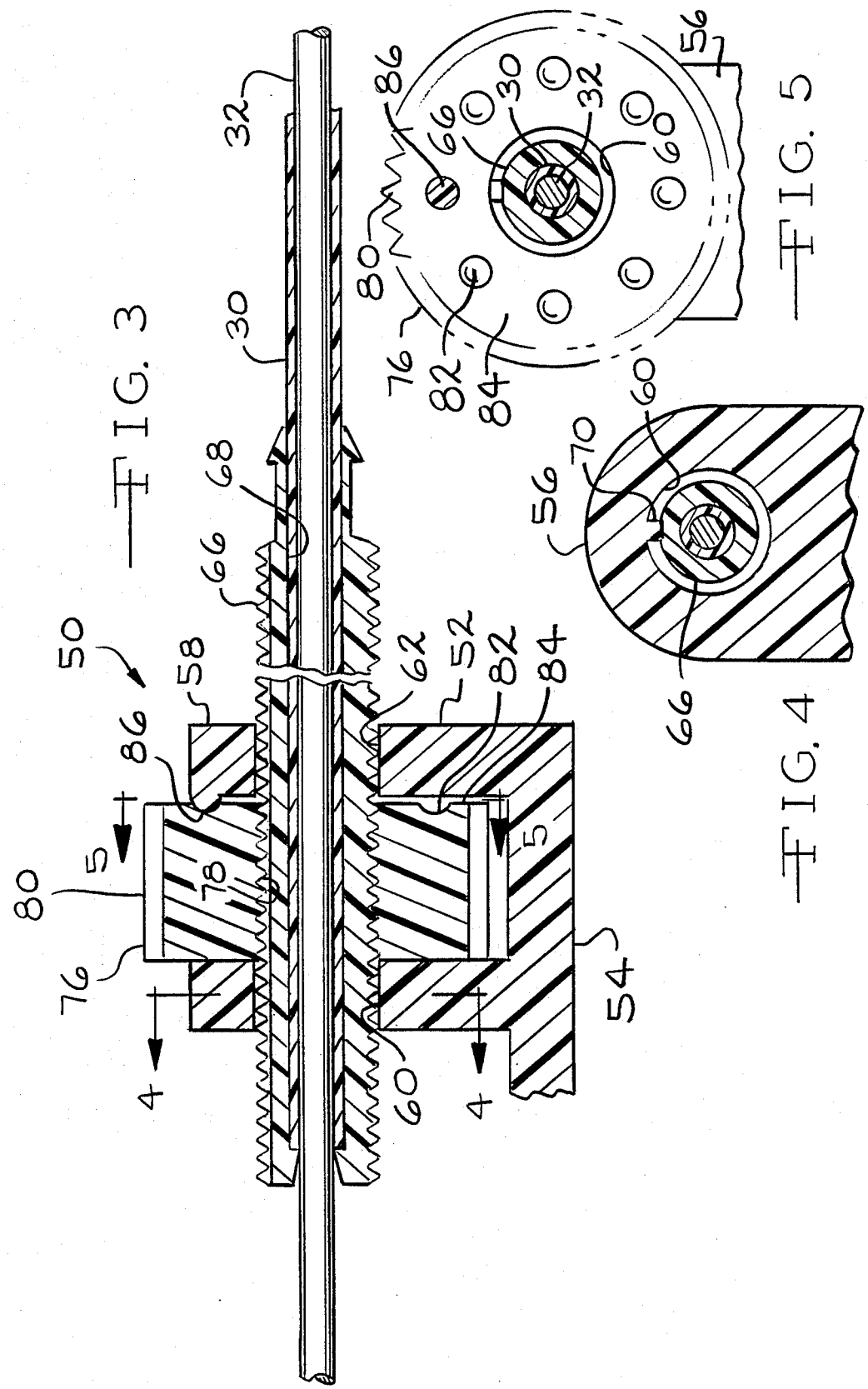

GEAR SELECTOR INDICATOR ADJUSTMENT MECHANISM

BACKGROUND AND SUMMARY OF THE INVENTION

This invention relates to a cable adjustment mechanism and particularly to one used as a part of a motor vehicle gear selector indicator assembly.

Conventional motor vehicles having automatic transmissions provide a means of visually indicating to the operator the gear shift position. For motor vehicles having conventional column mounted transmission shift levers, the indicator is frequently merely a pointer that moves with a sleeve fitting around the steering column shaft which is rotated by the shift lever. A transparent screen is positioned in front of the pointer with indicia printed on it such that the operator sees the pointer behind one of the indicator marks. In many motor vehicle designs, however, the gear selector indicator cannot be simply mounted to the steering column, due to packaging and styling considerations. It is therefore often necessary to provide a remote control device, typically in the form of a cable, which extends between the gear shift and a transmission selector indicator mounted within the vehicle's instrument panel or console.

Numerous prior art designs for remote control indicator devices of the above type are presently known. In one prior art design exemplified by U.S. Pat. No. 3,695,215, a flexible cable is affixed to the shift lever on the steering column with its opposite end engaging an indicator pointer. Due to manufacturing and assembly tolerance variations in the various components making up the indicator system, some means for properly calibrating the indicated gear position must provided. In the case of the aforementioned U.S. patent, a sliding bracket is employed which enables the position of the cable end with respect to the gear selector to be adjusted. Although this adjustment system operates generally satisfactorily, it requires a degree of operator skill for adjustment and the process is somewhat time consuming. One approach in simplifying the adjustment process is described by U.S. Pat. No. 3,830,192, which discloses an automatic slip clutch arrangement for adjusting the shift position indicator. Such automatic adjustment systems are fairly complex and cannot fully compensate for tolerance variations in all the components influencing the indicated shift position.

The shift selection indicator assemblies in accordance with the present invention improve over prior art devices in that they provide a simplified mechanism which enables accurate and rapid adjustment of the indicated shift position. The present systems include a cable assembly having a cable core which slides through a sheath. The adjustment mechanism has a threaded shaft meshing with a threaded adjustment wheel which changes the effective length of the outer sheath, thus changing the position of the gear selector indicator. A detent is provided so that the adjustment mechanism will remain in a set adjusted condition until an external force is applied to change the adjustment.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is a longitudinal cross-sectional view through the adjustment mechanism of the shift selection indicator assembly according to this invention.

FIG. 4 is a cross-sectional view taken along lines 4—4 of FIG. 3.

FIG. 5 is a cross-sectional view taken along line 5—5 of FIG. 3.

DETAILED DESCRIPTION OF THE INVENTION

Figure 1:
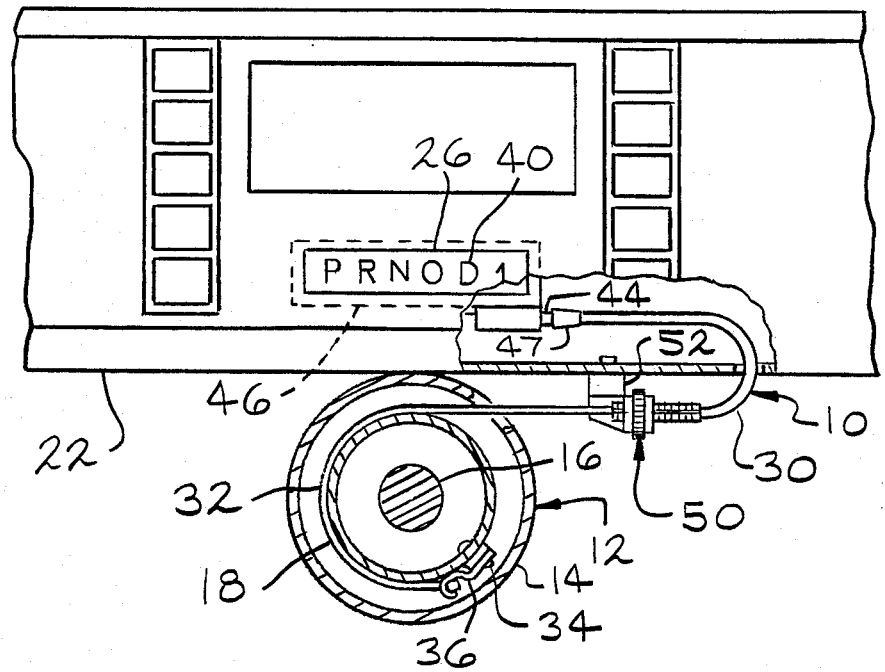
FIG. 1 is a frontal view of the shift selection indicator assembly according to a first embodiment of this invention shown affixed to an illustrative motor vehicle steering column and instrument panel.

FIG. 1 illustrates a shift selection indicator assembly according to a first embodiment of this invention which is generally designated by reference number 10. Indicator assembly 10 is shown attached to a motor vehicle having a steering column 12 with an outer column housing 14, a central steering shaft 16, and a shifter housing 18 carried by the column which is rotated through actuation of an external shift lever (not shown). Linkages (not shown) couple shifter housing 18 to the vehicle's automatic transmission to effectuate shift changes. Instrument panel 22 includes a visual gear selector display 26. As previously mentioned, indicator assembly 10 is provided to communicate the motion of shifter housing 18 to display 26.

Shift selection indicator assembly 10 principally comprises outer cable sheath 30, having cable core 32 passing therethrough. One end of cable core 32 is affixed to shifter housing 18 by threaded fastener 34 passing through clip 36. The opposite end of cable core 32 engages display pointer or flag 38 which is movable within display 26 to designate one of the gear selection indicia 40 shown. Pointer or flag 38 exerts tension on cable core 32 through spring 42. Outer sheath 30 has one end affixed to display housing 46 through the use of an insert molded, adhesive or thermal bonded bracket 44. Outer sheath 30 may also be applied directly to the display housing 46 by insert molding, adhesive or thermal bonding thus eliminating the need for bracket 44. The strength of these joints may or may not be enhanced with the addition of a shrink tube 47. The opposite end of cable outer sheath 30 engages adjustment mechanism 50 which is best described with reference to FIGS. 3 through 5 and comprises a principal feature of this invention.

Adjustment mechanism 50 includes mounting bracket 52 having baseplate 54, with a pair of extending generally parallel plates 56 and 58 extending therefrom. Plates 56 and 58 form aligned smooth bores 60 and 62, respectively. An externally threaded adjustment tube 66 is disposed to pass through bores 60 and 62 and has a hollow inside surface 68. Outer cable sheath 30 is inserted inside surf 68, and affixed therein through, for example, insert molding, adhesive or thermal bonding. An inwardly projecting key 70 formed by one or both of plates 56 and 58 engages with a longitudinal slot 72 formed along the threaded external surface of adjuster tube 66. With this arrangement, key 70 and slot 72 allow adjuster tube 66 to move longitudinally but prevents it from rotating.

Adjustment wheel 76 is positioned between plates 56 and 58 and has a threaded inside bore 78 which meshes with the external threads of adjuster tube 66. Adjustment wheel 76 preferably has a knurled or ribbed external surface 80 for convenient manual grasping and rotation.

A detent mechanism is provided which restrains adjustment wheel 76 from rotating until an external force is applied. The detent mechanism includes a plurality of angularly spaced depressions 82 formed by face 84 of adjustment wheel 76. Plate 58 forms projection 86 which is shaped to engage depressions 82, as shown in FIGS. 3 and 5. Upon rotation of adjustment wheel 76, slight deformation of plate 58 occurs, which allows projection 86 to move out of engagement with one of depressions 82, and re-engages another of depressions 82 upon rotation.

Figure 2:
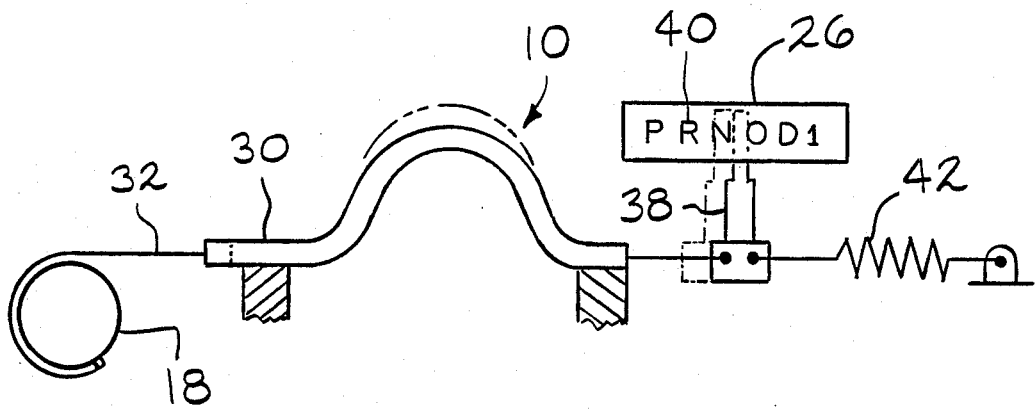
FIG. 2 is a diagrammatic view showing the manner in which the shift selection indicator assembly according to this invention provides changes in the shift selection indication.

In operation, rotation of adjustment wheel 76 causes longitudinal movement of adjustment tube 66. FIG. 2 provides a graphical illustration of the result of such longitudinal position changes. Rotation of adjustment wheel 76 changes the effective length of outer sheath 30, as illustrated by the full and phantom line positions of the outer sheath shown in FIG. 2. Such changes in the effective length of outer sheath 30 cause minor adjustments in the position of display pointer or flag 38, as shown in FIG. 2. Accordingly, once indicator assembly 10 is installed, an assembly worker can calibrate the system by reaching under the instrument panel, and rotating adjustment wheel 76 while observing the position of pointer 38. Such adjustments can also be made during the life of the motor vehicle.

Figure 6:
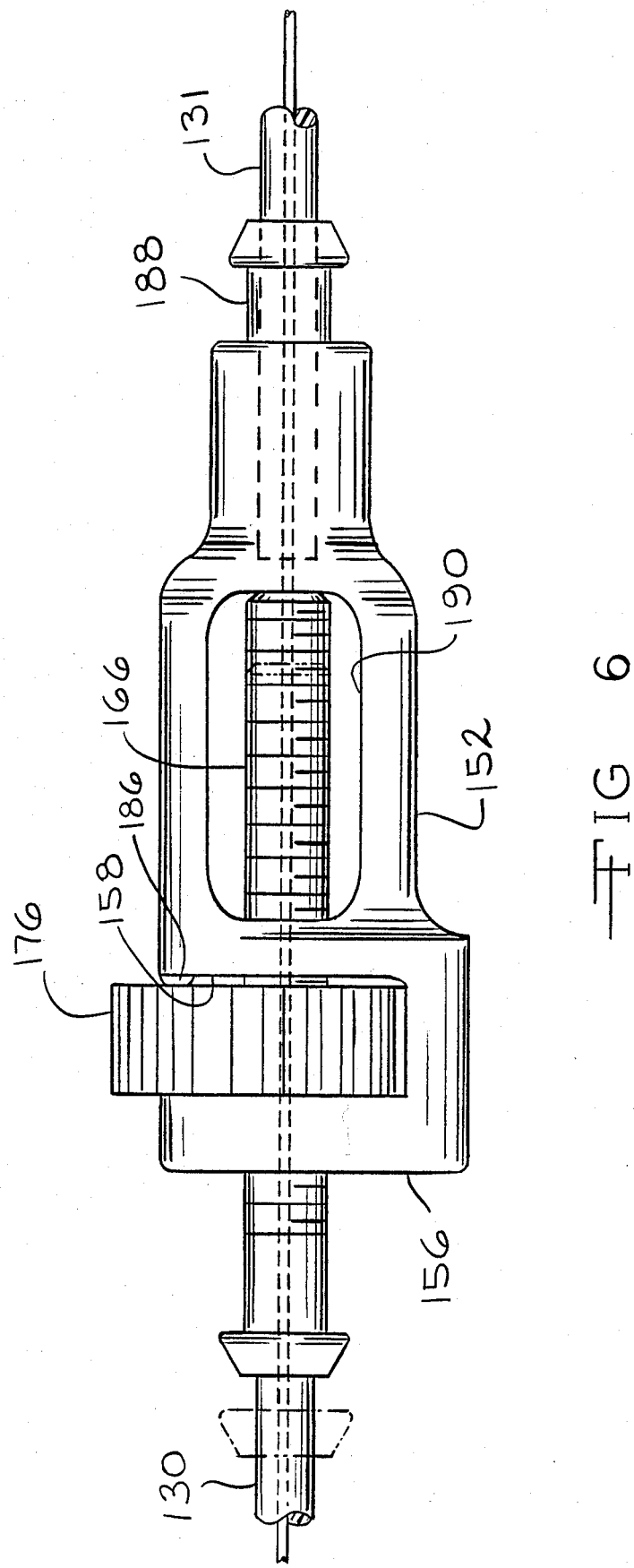
FIG. 6 is a side elevational view of a shift selection indicator assembly according to a second embodiment of this invention.

FIG. 6 illustrates a shift selection indicator assembly according to a second embodiment of this invention which is generally designated by reference 110. For this embodiment, elements which correspond to those of the first embodiment are designated by like reference numbers with 100 added. Shift indicator assembly 110 is adapted to be installed in-line along a cable such that it does not need to be mounted to a fixed mounting structure. For this embodiment, a pair of outer sheaths 130 and 131 join the device. Adjustment tube 166 is received within housing 152 having end 188 which receives sheath 131. Adjustment wheel 176 meshes with tube 166 and a detent is provided through the interaction between depressions and projection 186 on housing surface 158 and adjustment wheel 176, respectively. In order to enhance rigidity, a collar of heat shrink tubing (not shown) can be placed at the connection of outer sheath portions 130 and 131 with adjustment tube 166 and housing end 188. A cut-out sight opening 190 is provided for assembly 110 to provide a visual indication of the adjusted position and range of adjustment of the device.

In operation, shift selection assembly 110 operates like the first embodiment except that it provides a greater range of selection of positioning since it can be located at any easily accessed portion along the cable assembly.

While the above described embodiments according to this invention are discussed in connection with a shift indicator assembly, the principals and design features of the present invention can equally be applied to other applications where cable adjustments are necessary, such as bicycle brake and gear change cables.

While the above description constitutes the preferred embodiments of the present invention, it will be appreciated that the invention is susceptible to modification, variation and change without departing from the proper scope and fair meaning of the accompanying claims.

I claim:

1. A motor vehicle automatic transmission gear selector indicator assembly which indicates the position of a gear shifter and permits the indicated gear position to be adjusted comprising:

a display having gear selector designations and movable means for indicating one of said gear selector designations, and compliant means urging said movable means in one direction, a cable assembly having an outer sheath with first and second mounting means for mounting the opposite ends of said sheath, said cable assembly further having a cable core sliding within said sheath with a first end connected to said display movable means and a second end connected to said gear shifter, wherein tension on said core urges said indicator movable means to move against said compliant means, and an adjustment mechanism including a hollow externally threaded tube with said sheath fixed to said tube with said core passing through said tube, an adjustment wheel having a threaded bore meshing with said external threads of said tube, and a bracket which traps said adjustment wheel, said tube and said bracket including anti-rotation means for preventing rotation of said tube, and said adjustment mechanism further having detent means which restrains said adjustment wheel from rotation until it is forcibly rotated through an external force, whereby, rotation of said wheel caused longitudinal movement of said tube and changes the indicated position of said gear selector display.

2. A motor vehicle automatic transmission gear selector indicator assembly according to claim 1 wherein said anti-rotation means comprises a longitudinal slot along the external surface of said tube and an interfitting key formed by said bracket engaging said slot.

3. A motor vehicle automatic transmission gear selector indicator assembly according to claim 1 wherein said detent means comprises said adjustment wheel having a radial face which forms a plurality or angularly spaced depressions, and said bracket forming a projection engagable with said depressions whereby when said projection engages one of said depressions, rotation of said wheel is resisted.

4. A motor vehicle automatic transmission gear selector indicator assembly according to claim 1 wherein said bracket comprises a baseplate having means for fixing it to a motor vehicle structure, a pair of generally parallel plates extending from said base plate and defining a separation gap which said adjustment wheel is disposed in.

5. A motor vehicle automatic transmission gear selector indicator assembly according to claim 1 wherein said display movable means comprises a movable pointer or flag.

6. A motor vehicle automatic transmission gear selector indicator assembly according to claim 1 wherein said adjustment mechanism bracket is mounted to one of said mounting means.

7. A motor vehicle automatic transmission gear selector indicator assembly according to claim 1 wherein said cable outer sheath is divided into a pair of sections with one of said sections attached to said tube and another of said sections attached to said bracket.

* * * * *